US012548639B2

(12) United States Patent
Parrish et al.

(10) Patent No.: US 12,548,639 B2
(45) Date of Patent: Feb. 10, 2026

(54) DETERMINING THE INTRINSIC REACTION COORDINATE OF A CHEMICAL REACTION BY NESTED PATH INTEGRALS

(71) Applicant: QC Ware Corp., Palo Alto, CA (US)

(72) Inventors: Robert Michael Parrish, Woodside, CA (US); Edward Grafton Hohenstein, Gainesville, GA (US); Bryan Scott Fales, Midland, MI (US); Andrew Craig Simmonett, Arlington, VA (US)

(73) Assignee: QC Ware Corp., Palo Alto, CA (US)

( * ) Notice: Subject to any disclaimer, the term of this patent is extended or adjusted under 35 U.S.C. 154(b) by 0 days.

(21) Appl. No.: 18/610,635

(22) Filed: Mar. 20, 2024

(65) Prior Publication Data

US 2024/0321408 A1    Sep. 26, 2024

Related U.S. Application Data

(60) Provisional application No. 63/453,585, filed on Mar. 21, 2023.

(51) Int. Cl.
*G16C 20/30* (2019.01)
*G16C 10/00* (2019.01)

(52) U.S. Cl.
CPC ............ *G16C 20/30* (2019.02); *G16C 10/00* (2019.02)

(58) Field of Classification Search
CPC ......... G16C 20/30; G16C 10/00; G16C 20/10
See application file for complete search history.

(56) References Cited

U.S. PATENT DOCUMENTS

| | | | |
|---|---|---|---|
| 7,844,431 B2 | 11/2010 | Paxson et al. | |
| 10,622,098 B2 | 4/2020 | Coley et al. | |
| 11,309,063 B2 | 4/2022 | Dey et al. | |
| 2002/0111761 A1* | 8/2002 | Edgecombe | G16C 20/30 |
| | | | 702/137 |
| 2021/0065851 A1 | 3/2021 | Madrid et al. | |

OTHER PUBLICATIONS

PCT International Search Report and Written Opinion, PCT Application No. PCT/US2024/020800, Jul. 8, 2024, nine pages.
Shiga, M. et al., "A quantum generalization of intrinsic reaction coordinate using path integral centroid coordinates," The Journal of Chemical Physicals, vol. 136, May 9, 2012, pp. 184103-1-184103-11.
Aguilar-Mogas, A. et al. "Applications of analytic and geometry concepts of the theory of calculus of variations to the intrinsic reaction coordinate model," Molecular Physics, vol. 105, No. 19-22, Oct. 10, 2007, pp. 2475-2492.
Baker, J. "An algorithm for the location of transition states," Journal of Computational Chemistry, vol. 7, No. 4, Aug. 1986, pp. 385-395.

(Continued)

*Primary Examiner* — Lee E Rodak
*Assistant Examiner* — Byung Ro Lee
(74) *Attorney, Agent, or Firm* — Fenwick & West LLP

(57) ABSTRACT

A computer system can perform a computational methods of determining intrinsic reaction coordinates (IRCs) for chemical transformations (e.g., chemical reactions) via dual nested integration.

20 Claims, 13 Drawing Sheets

(56) References Cited

OTHER PUBLICATIONS

Banerjee, A. et al. "Search for stationary points on surfaces," The Journal of Physical Chemistry, vol. 89, No. 1, Jan. 1985, pp. 52-57.

Birkholz, A. et al. "Path optimization by a variational reaction coordinate method. I. Development of formalism and algorithms," The Journal of Chemical Physics, vol. 143, No. 24, Dec. 28, 2015, 12 pages.

Birkholz, A. et al. "Path optimization by a variational reaction coordinate method. II. Improved computational efficiency through internal coordinates and surface interpolation," The Journal of Chemical Physics, vol. 144, No. 18, May 14, 2016, 12 pages.

Cerjan, C. et al. "On finding transition states," The Journal of Chemical Physics, vol. 75, No. 6, Sep. 15, 1981, pp. 2800-2806.

Crehuet, R. et al. "The reaction path intrinsic reaction coordinate method and the Hamilton-Jacobi theory," The Journal of Chemical Physics, vol. 122, No. 23, Jun. 15, 2005, 17 pages.

Fukui, K. "Formulation of the reaction coordinate," The Journal of Physical Chemistry, Nov. 1970, vol. 74, No. 23, pp. 4161-4163.

Fukui, K. "The path of chemical reactions—the IRC approach," Accounts of Chemical Research, Dec. 1, 1981, vol. 14, No. 12, pp. 363-368.

Govind, N. et al. "A generalized synchronous transit method for transition state location," Computational Materials Science, vol. 28, No. 2, Oct. 1, 2003, 250-258.

Halgren, T.A. et al. "The synchronous-transit method for determining reaction pathways and locating molecular transition states," Chemical Physics Letters, Jul. 15, 1977, vol. 49, No. 2, pp. 225-232.

Henkelman, G. et al. "A climbing image nudged elastic band method for finding saddle points and minimum energy paths," The Journal of Chemical Physics, vol. 113, No. 22, Dec. 8, 2000, pp. 9901-9904.

Henkelman, G. et al. "A dimer method for finding saddle points on high dimensional potential surfaces using only first derivatives," The Journal of Chemical Physics, vol. 111, No. 15, Oct. 15, 1999, pp. 7010-7022.

Henkelman, G. et al. "Improved tangent estimate in the nudged elastic band method for finding minimum energy paths and saddle points," The Journal of Chemical Physics, vol. 113, No. 22, Dec. 8, 2000, pp. 9978-9985.

Jónsson, H. et al. "Nudged elastic band method for finding minimum energy paths of transitions," Classical and quantum dynamics in condensed phase simulations, 1998, pp. 385-404.

Peng, C. et al. "Combining Synchronous Transit and Quasi-Newton Methods to Find Transition States," Israel Journal of Chemistry, Jul. 8, 1993, vol. 33, No. 4, 449-454.

Peters, B. et al. "A growing string method for determining transition states: Comparison to the nudged elastic band and string methods," The Journal of Chemical Physics, vol. 120, No. 17, May 1, 2004, pp. 7877-7886.

Quapp, W. "Chemical reaction paths and calculus of variations," Theoretical Chemistry Accounts, vol. 121, Dec. 2008, 10 pages.

Simons, J. et al. "Walking on potential energy surfaces," The Journal of Physical Chemistry, vol. 87, No. 15, Jul. 1983, pp. 2745-2753.

Weinan, E. et al. "String method for the study of rare events," Physical Review B, vol. 66, No. 5, Aug. 12, 2002, 4 pages.

Heuer, M. A. et al., "Integrated Reaction Path Processing from Sampled Structure Sequences," Journal of Chemical Theory and Computation, vol. 14/Issue 4, Mar. 8, 2018, pp. 2052-2062.

Heuer, M. A. et al., "Integrated Reaction Path Processing from Sampled Structure Sequences," arXiv:1801.02100v1, Jan. 6, 2018, pp. 1-19.

* cited by examiner

300

310 Perform a dual nested integration of two polynomial splines, where performing the dual nested integration comprises:

Parameterizing a first polynomial spline according to a set of control points, the first polynomial spline describing molecular coordinates as a function of a parameter coordinate describing progress along a candidate IRC path
315

Computing the integral of the first polynomial spline, the integrated first polynomial spline describing length along the candidate IRC path as a function of the parameter coordinate
320

Generating a second polynomial spline by inverting the length and parameter coordinates of the integrated first polynomial spline
325

Parameterizing the second polynomial spline according to interpolated sampling points along the integral of the first polynomial spline, the second polynomial spline describing the gradient of the potential energy surface along the candidate IRC path
330

Computing an action integral, the action integral being the integral of the second polynomial spline, wherein the integral of the first polynomial spline is the integrand of the second polynomial spline integral
335

340 Determining the IRC path based on the action integral

FIG. 3

DETERMINING THE INTRINSIC REACTION COORDINATE OF A CHEMICAL REACTION BY NESTED PATH INTEGRALS

1. CROSS-REFERENCE TO RELATED APPLICATION

This application claims priority to and the benefit of U.S. Provisional Application No. 63/453,585, filed Mar. 21, 2023, which is hereby incorporated by reference in its entirety.

2. BACKGROUND

2.1. Technical Field

This disclosure relates to the field of computational chemistry and more specifically to determining an intrinsic reaction coordinate (IRC) of a chemical transformation (e.g., chemical reaction).

2.2. Description of Related Art

Various conventional methods have attempted to compute the IRCs of chemical transformations, however these methods (e.g., growing string method (GSM), nudged elastic band (NEB)) often fail to converge robustly to a reasonable transition state or IRC path.

3. SUMMARY

Chemical transformations are the rearrangement of atoms in a molecule or exchange of atoms between molecules. Traditionally, the study of chemistry is empirical, with post-hoc reasoning applied to repeated observations. Often, chemical rearrangements are complex and exceedingly difficult to accurately calculate within a reasonable period of time, because of the spatial, energetic, and temporal parameters involved. Prediction of a chemical transformation without exhaustive empirical testing remains an unmet need in the fields of science and engineering. A chemical transformation can be mathematically represented by the progression of molecular geometry or geometries along their potential energy surfaces. Without wishing to be bound to the specifics of particular chemical transformations, each chemical transformation is posited to have a unique intrinsic reaction coordinate. The present disclosure, in some embodiments, provides description and teachings for determining an intrinsic reaction coordinate with minimal computation complexity or computational expense.

In some embodiments, the present disclosure provides a method for determining an intrinsic reaction coordinate of any given set of molecular geometries. In some embodiments of the present disclosure provides a method for determining with arbitrary accuracy an intrinsic reaction coordinate of any molecular geometries. Accurate and reproducible determination of an intrinsic reaction coordinate provides reaction kinetics prediction and simulation. Accurate and reproducible determination of an intrinsic reaction coordinate, in particular, one or more transition states of an intrinsic reaction coordinate has utility in furtherance of innumerable fields of science and engineering.

Among other aspects, the present disclosure provides utility for the calculation, determination, and prediction of molecular geometries (i.e., architecture(s)) involved in catalyst development (e.g., new chemical reactions), drug discovery (e.g., transition state mimics), structural biology (e.g., protein folding), chemical reaction feasibility (e.g., reactor engineering for carbon dioxide capture or waste recycling), chemical reaction selectivity (e.g., total synthesis), enantioselectivity, diastereoselectivity (e.g., drug development), computational toxicology (e.g., metabolic simulation), etc.

This disclosure describes a new set of strategies for numerically determining the characteristic "intrinsic reaction coordinate" (IRC) path linking the reactants and products of a chemical reaction on the potential energy surface of the involved molecules. Our strategies aim to improve the performance of numerical algorithms for automated intrinsic reaction coordinate determination, where performance may be measured in terms of likelihood of finding a robust solution, time to solution, solution accuracy, or a combination thereof.

This disclosure reports a new, two-level (dual) nested path integral technique for the numerical determination of an intrinsic reaction coordinate (IRC). The approach represents the proposed IRC as a fixed-order polynomial spline in the coordinates of the atomic positions, with the spline parametrized by a fictitious "time" coordinate. This time coordinate monotonically describes the progress from reactant to product along the IRC, but is not linearly related to length along the IRC, and therefore is not appropriate for efficient sampling of the potential energy surface contributions of the standard single path integral form of the variational IRC. To overcome this difficulty without introducing nontrivial constraints into the control parameters of the position spline, the first spline is used to determine the distance along the path for any point on the IRC by solving an intermediate path integral.

This results in a second, nested path integral for the IRC action, written in the natural units of path length. A set of sampling points are laid down in the length coordinate along the path. The potential energy surface is sampled at these points, and then a second spline model of the gradient of the potential energy surface along the path is constructed from these samples. The second spline is naturally parametrized in the length coordinate of the path rather than the unphysical time units of the position path.

There are two sets of points that govern the splines: control points that govern the shape of the spline—more control points provide more flexibility. Sampling points are where the objective function is evaluated—more sampling points lead to increased fidelity in the objective function.

With this dual-level representation with one spline for the path position and a second, nested spline for the potential gradient, we have a well-defined continuous representation of both the IRC path and the potential energy gradient along this path. With these objects, numerical techniques can be used to compute the pair of total path length and total IRC action path integrals to arbitrary precision.

The analytical gradient of the total IRC action with respect to the defining characteristics of the first polynomial spline of path positions can be obtained with this machinery, allowing continuous optimization techniques to be applied to optimize the candidate IRC. The complete technique can use computation of one potential energy gradient at each sampling point for the computation of the IRC action path integral.

4. BRIEF DESCRIPTION OF THE DRAWINGS

These and other features, aspects, and advantages of the present disclosure will become better understood with regard to the following description, and accompanying drawings, where:

Embodiments of the disclosure have other advantages and features which will be more readily apparent from the following detailed description and the appended claims, when taken in conjunction with the accompanying drawings, in which:

Figure 2A:
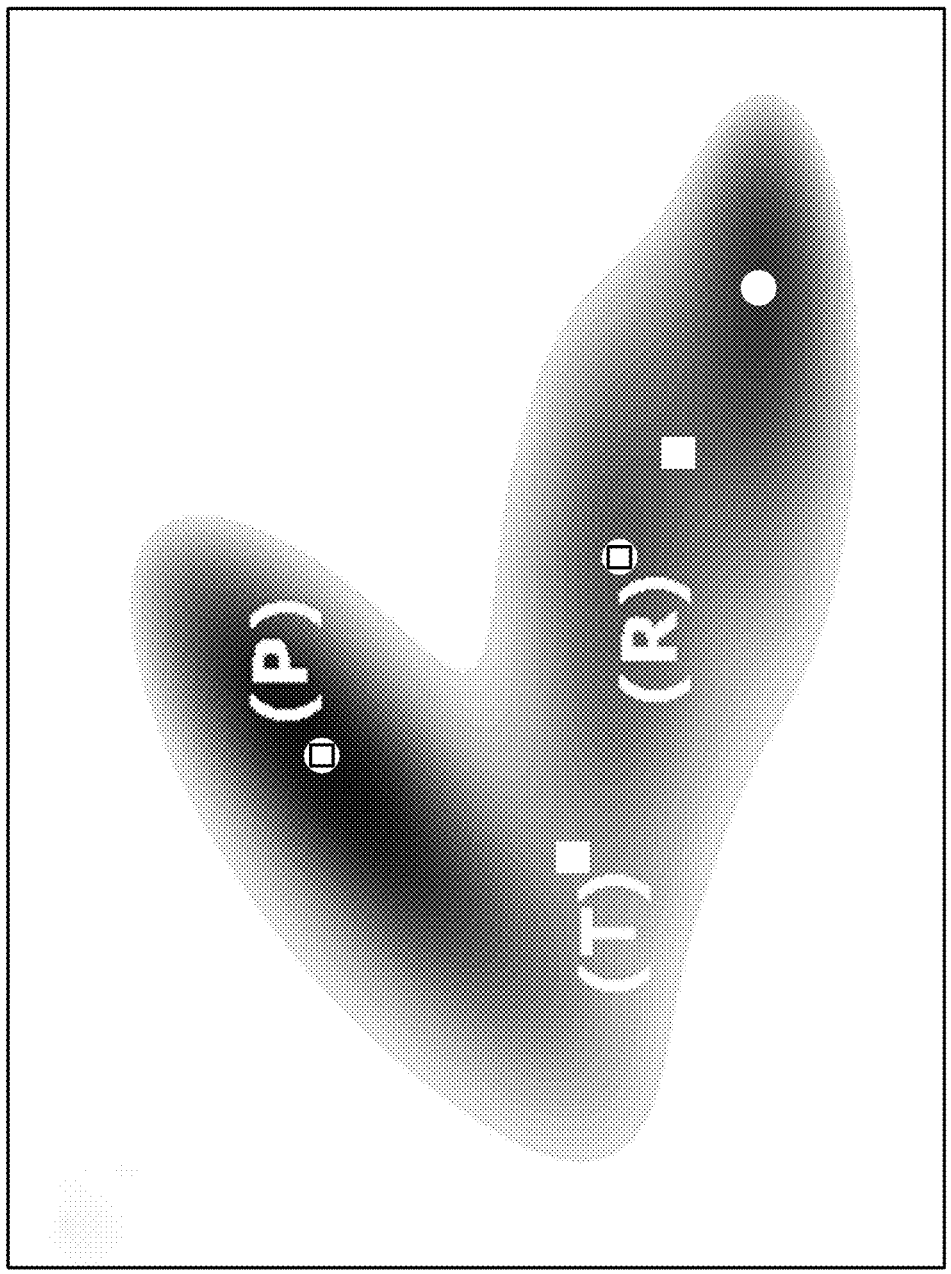
FIG. 2A illustrates a potential energy surface with starting reactant (R) and ending product (P) points highlighted. An approximation to the intermediate transition state (T) point highlighted will be determined as an aside of the intrinsic reaction coordinate optimization method.
Figure 2B:
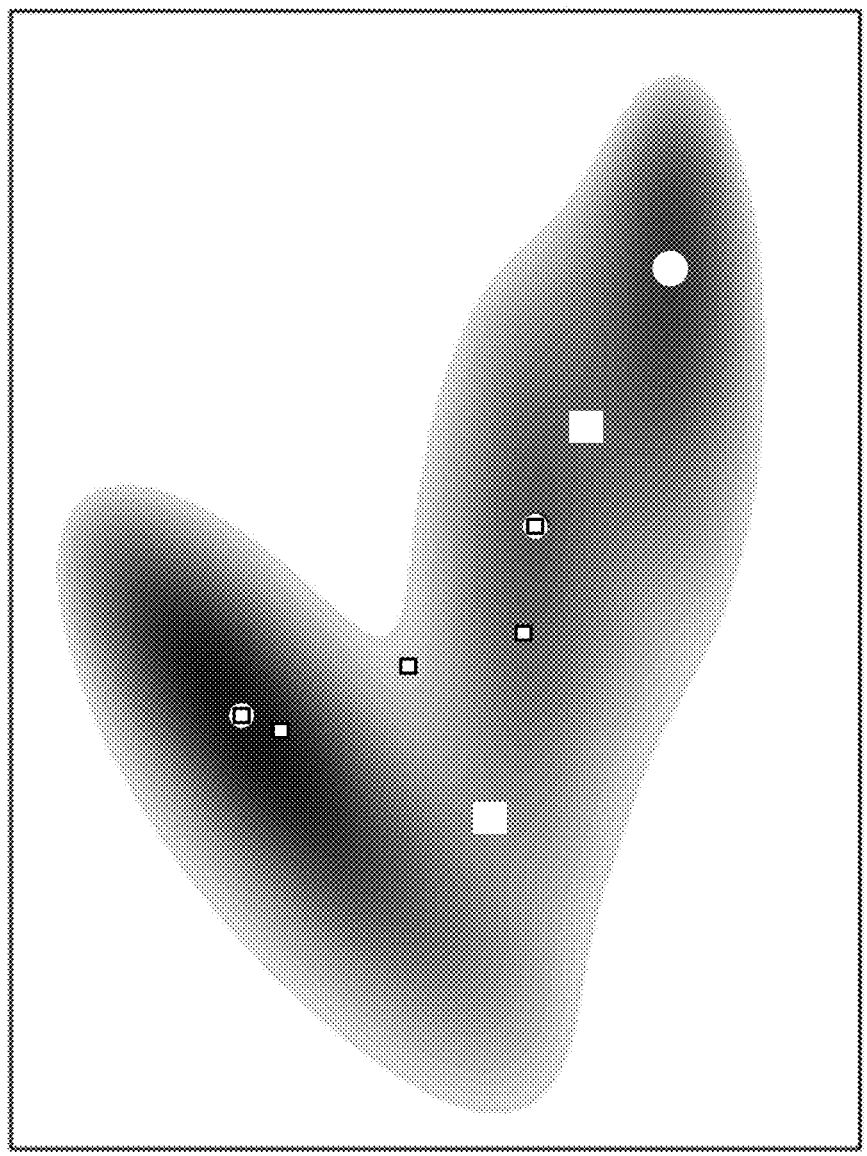

FIG. 2B illustrates intrinsic reaction coordinate control points $\{z^*_A{}^C\}$ are placed on the potential energy surface. This case uses an intrinsic reaction coordinate position spline of order $N_{control}=4$, yielding $N_{control}+1=5$ control points. Of these, 2 control points are fixed at the endpoints, leaving 3 interior control points open as the unrestricted parameters of the position spline.

Figure 2C:
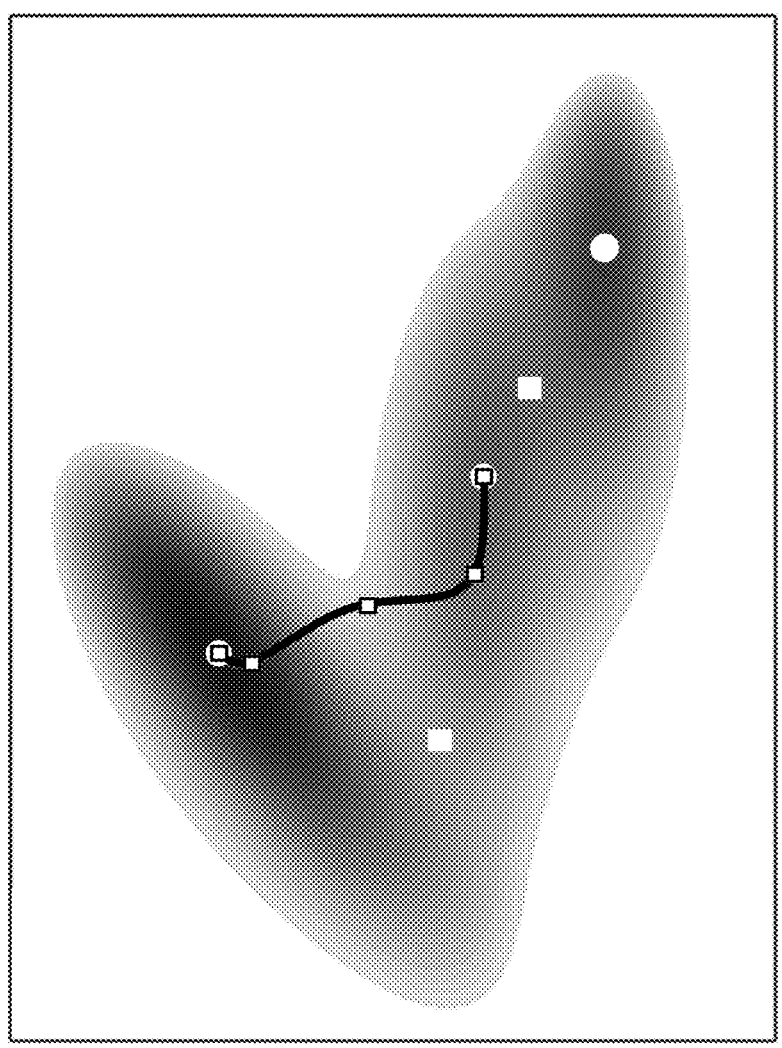

FIG. 2C illustrates a spline, $z_A(t)=P_{N_{control}}(t; \{z^*_A{}^C\})$, $t \in [0, 1]$, which fully defines the continuous intrinsic reaction coordinate path. It is visually apparent that varying the interior control point parameters $\{z^*_A{}^C\}$ will change the definition of the path.

Figure 2D:
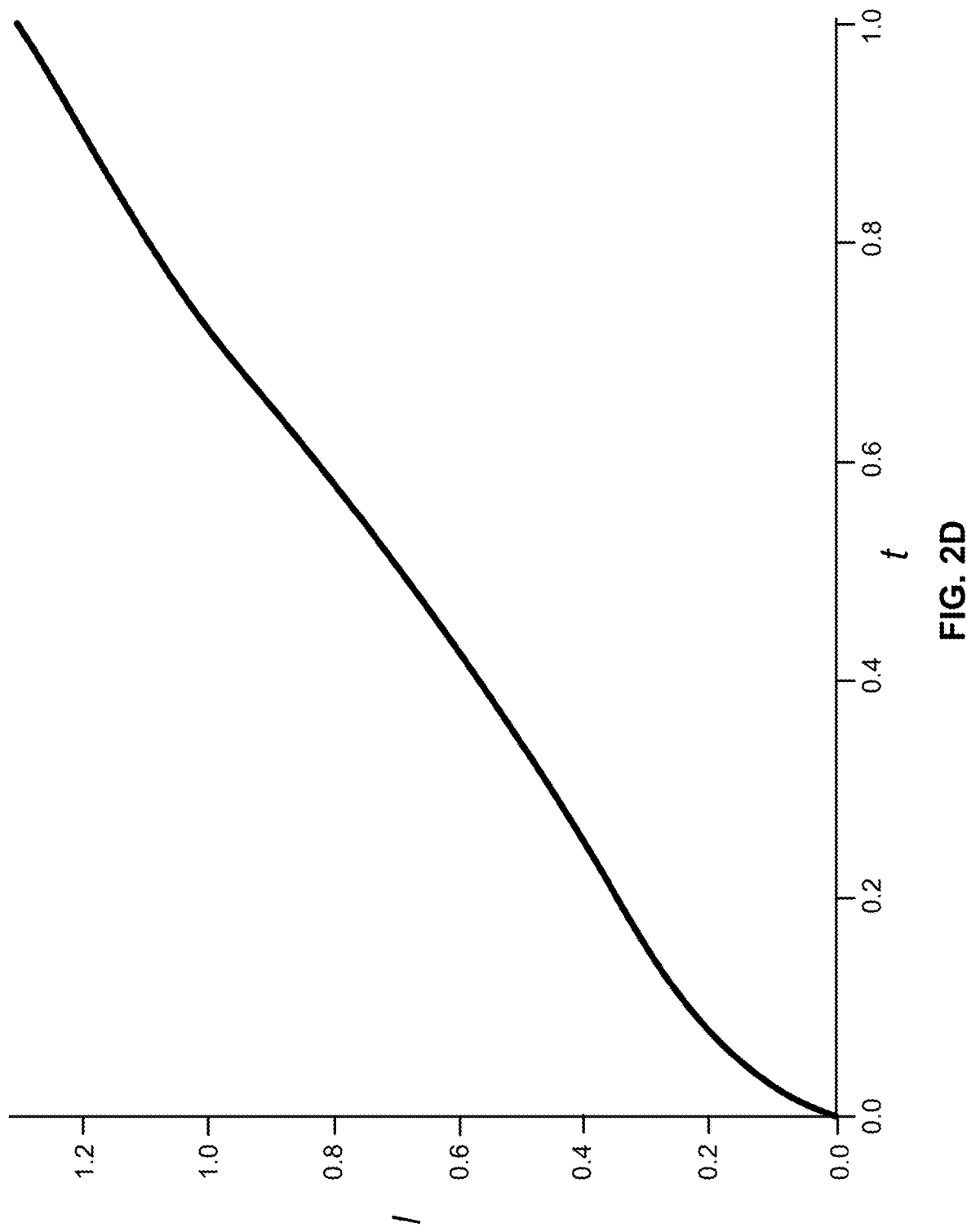

FIG. 2D illustrates a first length path integral, $$l(t) \equiv \int_0^t dt' \sqrt{\sum_A \left(\frac{dz_A(t')}{dt'}\right)^2},$$

which is determined to arbitrary precision from the characteristics of the position spline.

Figure 2E:
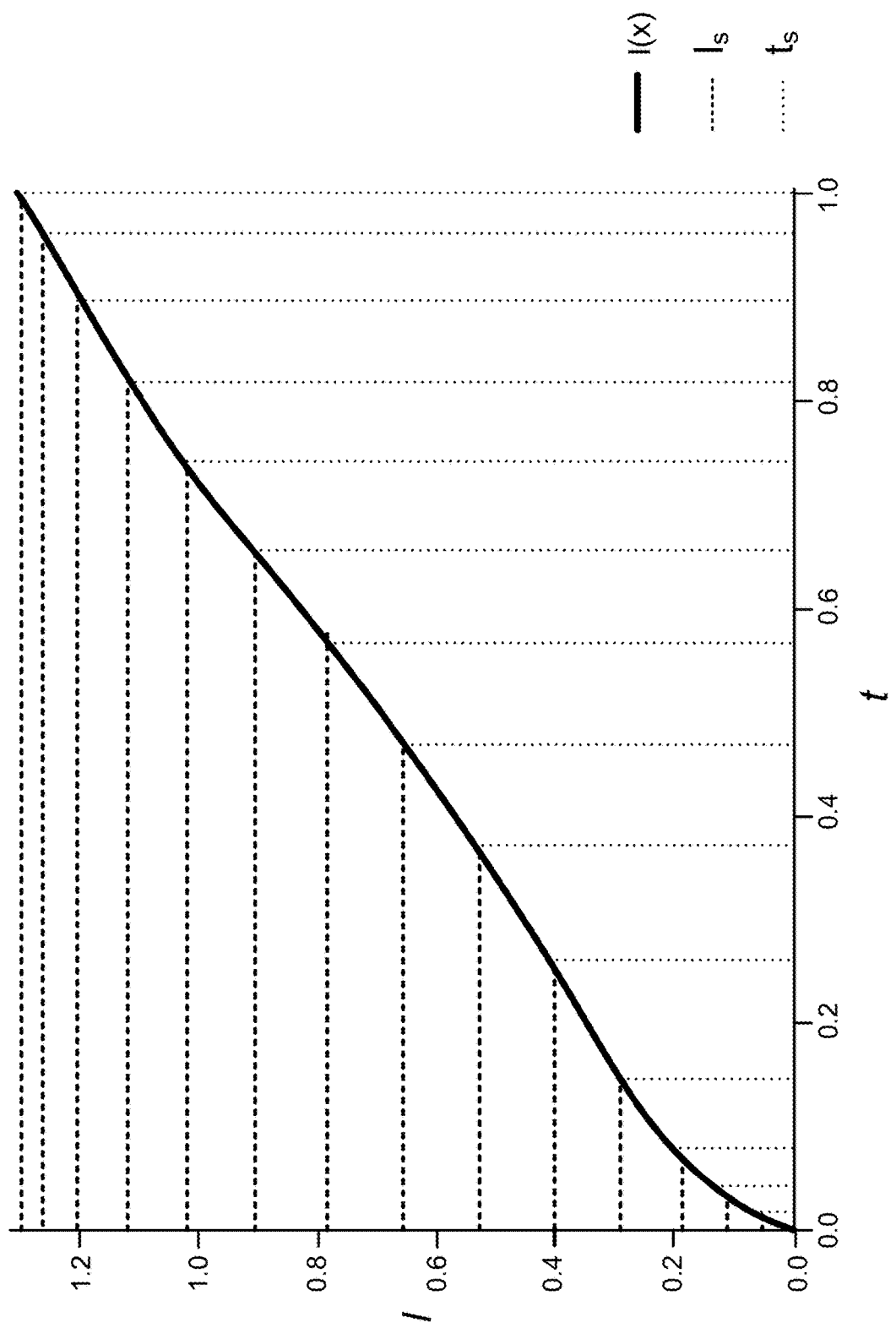

FIG. 2E illustrates sampling the Chebyshev-spaced length coordinates, $l_S \equiv Lu_S$ in l includes inverting the length path integral to determine the corresponding time coordinate $t_S$. For this example, $N_{sample}=16$, yielding $N_{sample}+1=17$ sample points.

Figure 2F:
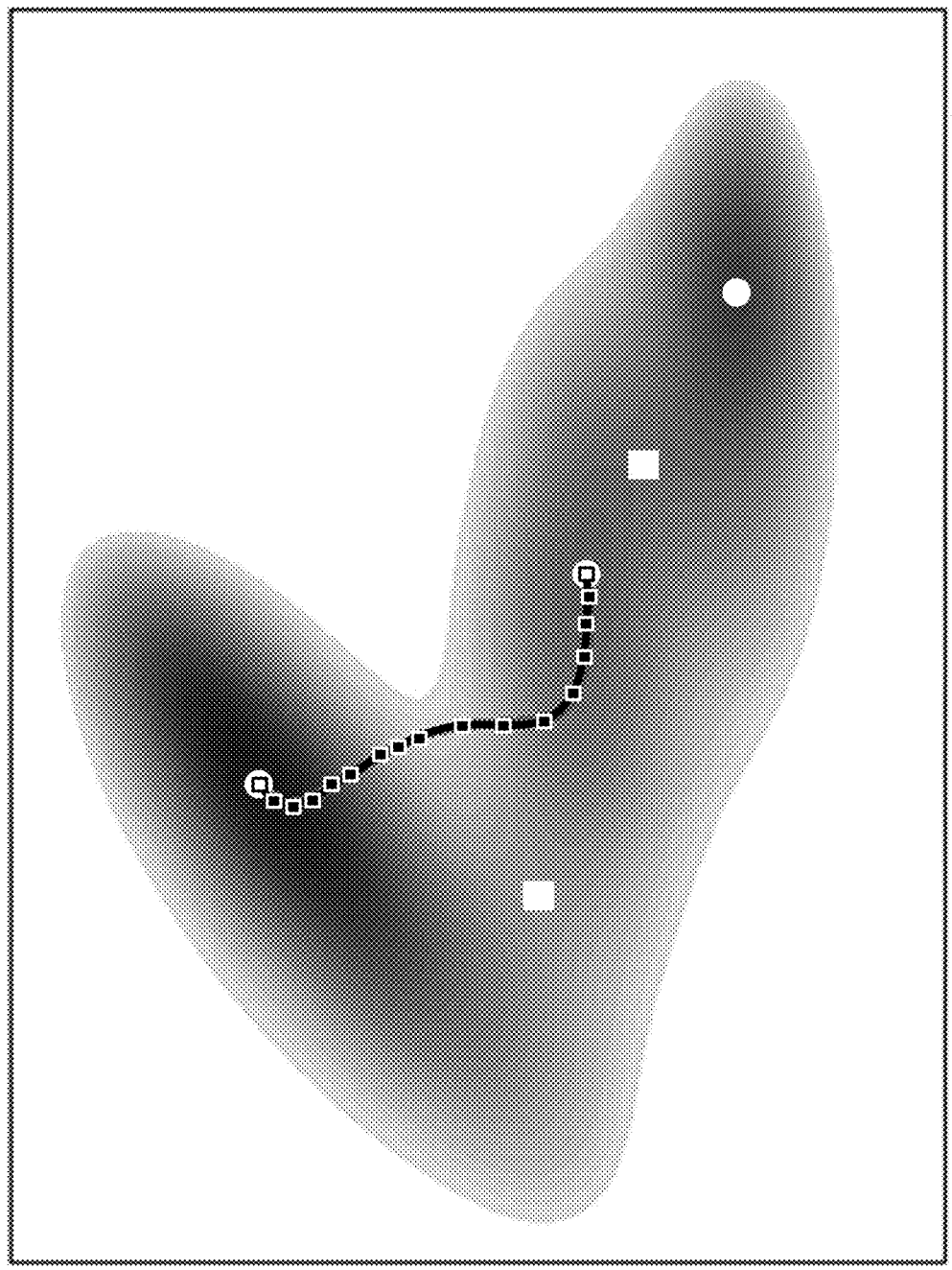

FIG. 2F illustrates an intrinsic reaction coordinate position spline can now be evaluated at the sampling times to obtain the sampling positions $z_A{}^S \equiv z_A(t_S)$.

Figure 2G:
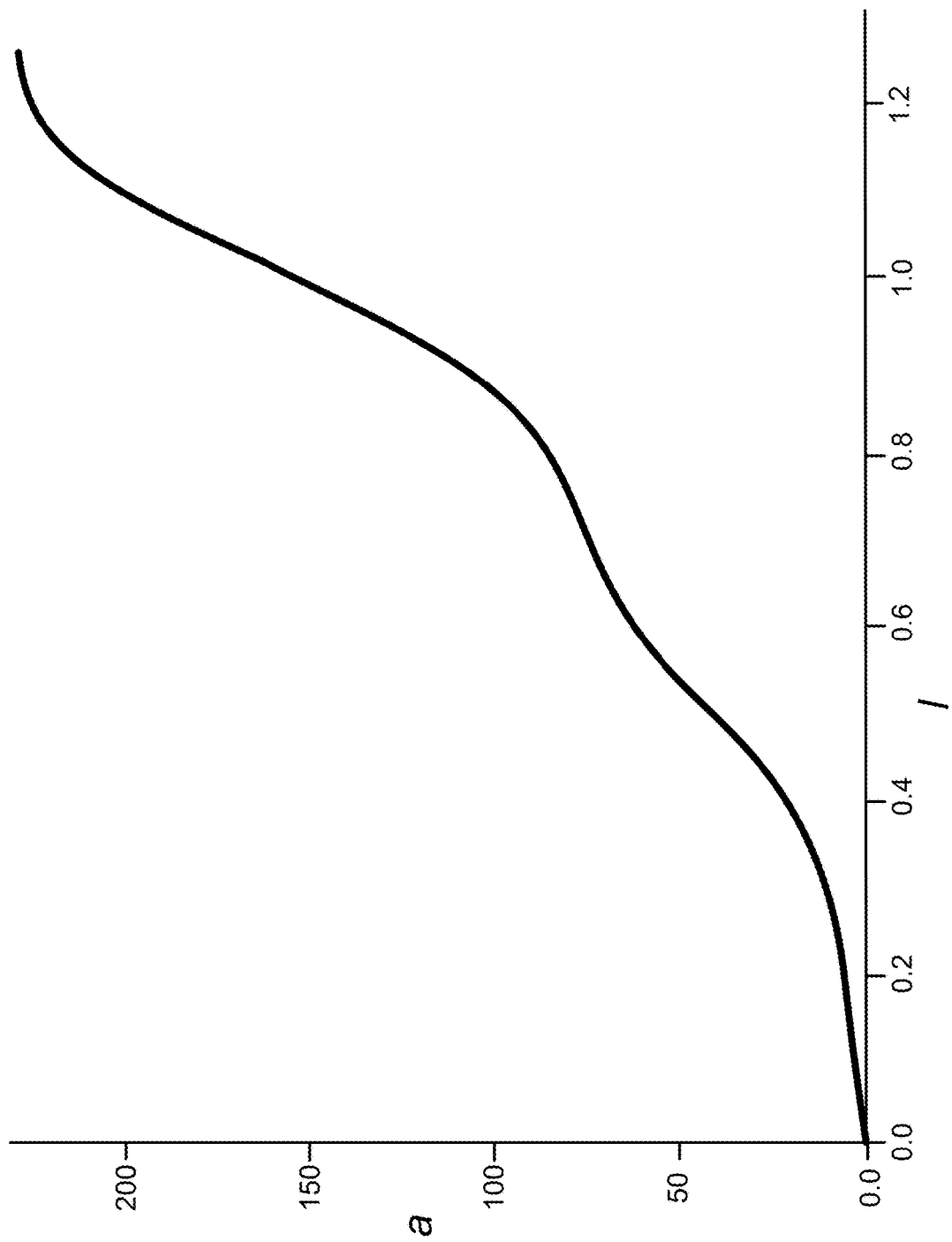

FIG. 2G illustrates the second, nested, action path integral, $$a(t) \equiv \int_0^t dt' \sqrt{\sum_A (g_A(t'))^2},$$

which is determined to arbitrary precision from the characteristics of the gradient spline.

Figure 2H:
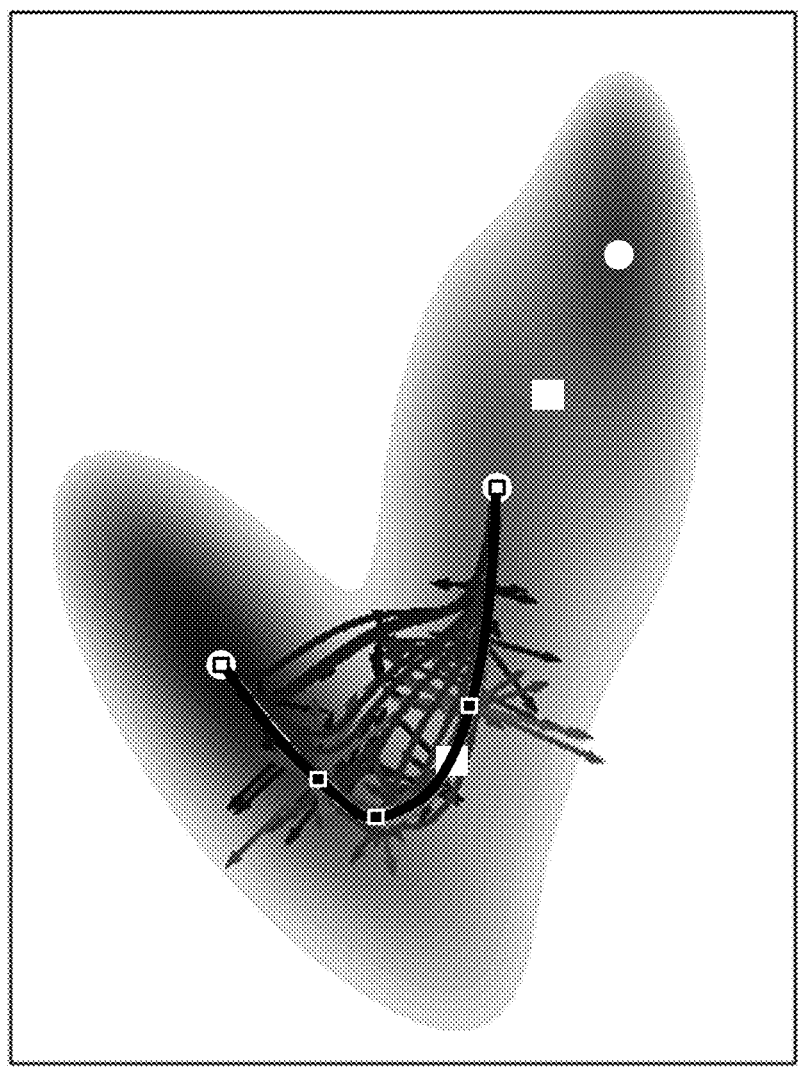
Figure 21:
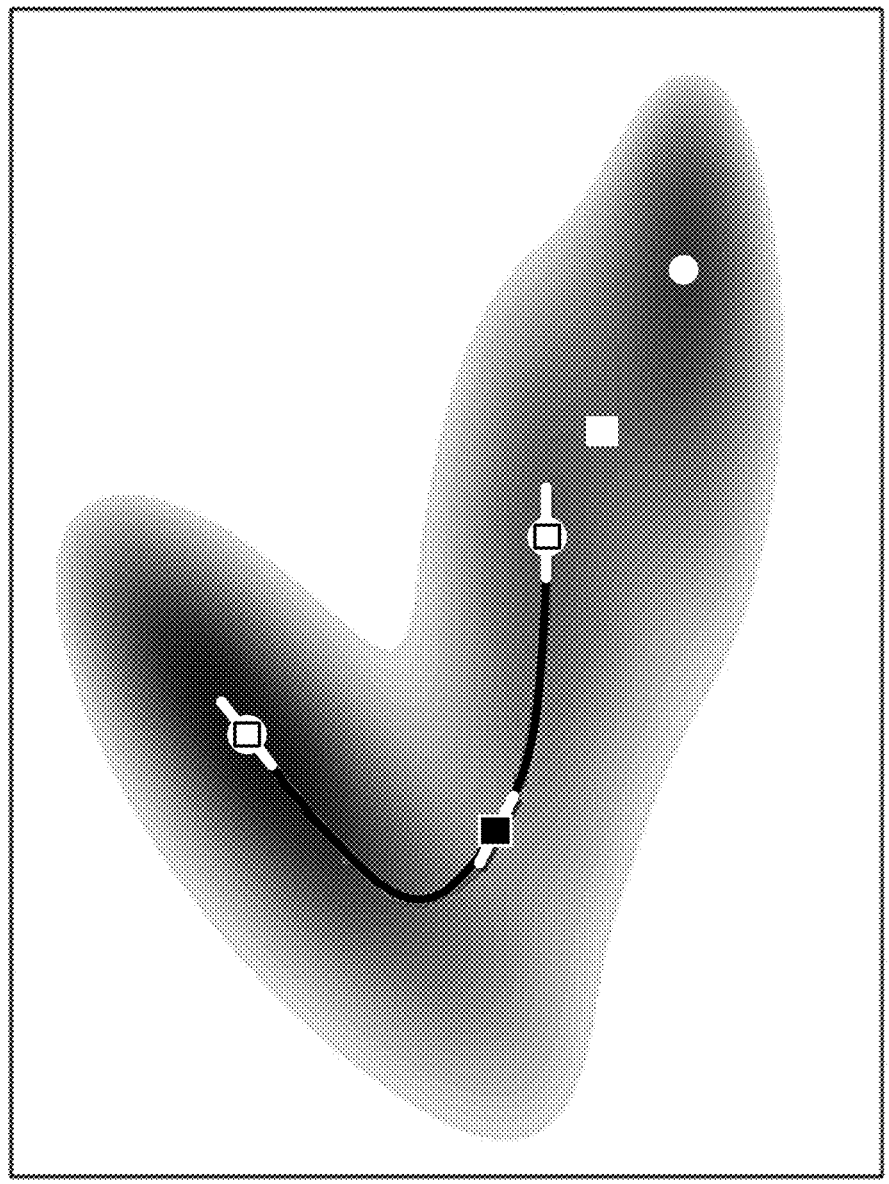

FIG. 2H illustrates the analytical gradient of the total action with respect to the interior control points of the intrinsic reaction coordinate position spline can now be determined, as indicated on the schematic by small arrows.

FIG. 2I illustrates the optimized dual-level path integral position spline.

FIG. 3 is a flowchart illustrating an example method for computing the IRC of a chemical reaction.

Figure 4:
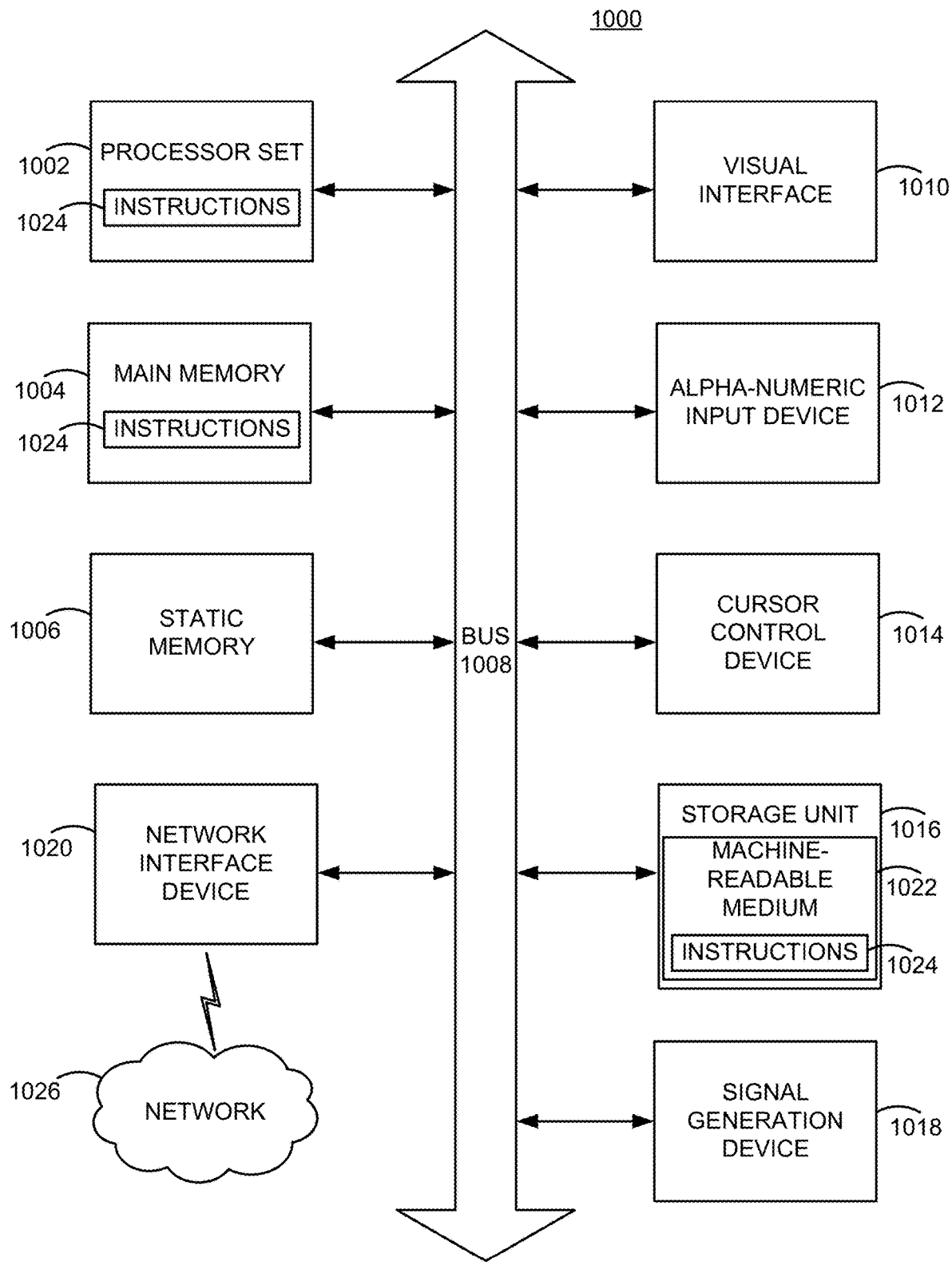

FIG. 4 is a block diagram illustrating an embodiment of components of an example machine able to read instructions from a machine-readable medium and execute them in a set of one or more processors (or controller).

The figures depict various embodiments for the purposes of illustration only. One skilled in the art will readily recognize from the following discussion that alternative embodiments of the structures and methods herein may be employed without departing from the principles described herein.

5. DETAILED DESCRIPTION

The figures and the following description relate to the preferred embodiments by way of illustration only. It should be noted that from the following discussion, alternative embodiments of the structures and methods disclosed herein will be readily recognized as viable alternatives that may be employed without departing from the principles of what is disclosed.

5.1. Introduction to Intrinsic Reaction Coordinate (IRC)

Molecular geometry includes the three-dimensional arrangement of atoms that constitute a molecule, including the general shape, bond lengths, bond angles, torsional angles, electrostatic, and quantum mechanical phenomenal that govern a molecule's stability and reactivity. Molecular geometry contributes to the perceived qualities of matter such as phase (e.g., solid, liquid, gas, supercritical fluid, plasma etc.), reactivity toward other atoms and/or molecules, heat, and/or electromagnetic radiation, color, magnetism, biological activity etc.

Molecular geometries include the set of all atoms involved in any given system of chemical transformation(s), where each set has within it defined subsets for rearrangements. Parameters of those subsets may include relative spatial orientation, bond enthalpy, electron spin distribution etc.

In computational chemistry, the determination of the intrinsic reaction coordinate is a ubiquitous task in the study of chemical reactions. A potential energy surface of a chemical system, i.e., a function that can be queried to determine the total energy of a collection of atoms at a given configuration of atomic positions, can be used in support of determining a mathematical solution. Such a potential energy surface can be obtained by an exact or approximate solution of the electronic Schrödinger equation in quantum chemistry methods such as ab initio, semiempirical, neural network, or force field methods. The reactants and products of a given chemical reaction can be defined as local minima on the potential energy surface, and efficient numerical techniques exist for the determination of these minima by continuous optimization approaches. The transition state that links reactant and product states is another quantity to consider—this object directly determines the kinetics and potential catalytic properties of the involved chemical reaction. The transition state is defined as a first-order saddle point on the potential energy surface. Numerous heuristic numerical techniques exist for transition state determination, but these techniques are notably less robust than the corresponding techniques for reactant/product optimization. Such techniques include linear synchronous transit (LST), quadratic synchronous transit (QST), the dimer method, partitioned rational function optimization (PRFO), and the growing string method. The intrinsic reaction coordinate is the continuous one-dimensional path that links the reactant and product states through the transition state in such a way that the path is everywhere tangent to the gradient of the potential energy. Numerous heuristic numerical techniques exist for intrinsic reaction coordinate determination, but these techniques are notably less robust than the corresponding techniques for reactant/product optimization. Such techniques include nudged elastic band (NEB) and variational reaction coordinate (VRC) optimization. VRC requires non-trivial Lagrangian constraints on the path spline spacing parameters to provide reasonable numerical performance and requires expensive evaluation of the full Hessian of the potential energy surface at each spline sampling point to provide for effective numerical optimization. Starting from a transition state, i.e., a first-order saddle point $z_A^T$ on the potential energy surface (in general, a simple minimum enumerates the mode characteristics of an object, e.g., a simple minimum has all positive Hessian eigenvalues, a simple transition state has exactly one negative Hessian eigenvalue, etc.). At the transition state, the gradient is zero, i.e., $g_A(\{z_A^T\})=0_A$, and one particular normalized direction $\tau_A$ is negative Hessian eigenvalue (all the other Hessian eigenvalues are positive). Traveling along this direction will lead toward the reactant(s), a simple minimum point $z_A^R$ where the gradient is zero and all the Hessian eigenvalues are positive. Traveling in the opposite direction will lead toward the product(s), a simple minimum point $z_A^T$ where the gradient is zero and all the Hessian eigenvalues are positive. The IRC is the continuous one-dimensional path linking the reactant to the product through the transition state and with the constraint that the gradient is everywhere tangent to the path.

The gradient-path-tangency picture of the IRC has been the traditional definition of the IRC since its inception by Kenichi Fukui and others in the 1970s. Indeed, this picture leads to a simple and mathematically rigorous differential form definition of the IRC, $$\frac{dz_A}{d\xi} = g_A(\{z_A\})$$

that can be used to numerically produce the IRC from a converged transition state geometry by integrating forward in a sort of imaginary time $\xi$ from the transition state starting in the direction of the Hessian imaginary mode.

A major advance was made in the mid 2000s which pointed out that the differential form of the IRC condition is equivalent to the path integral form. However, this finding transforms the differential form of the IRC into a variational calculus form with a proper objective function. However, it remained conceptually very difficult to transform from this continuous variational calculus form to an efficient and robust form for numerical optimization on modern computers, particularly when the cost of sampling the potential energy gradient is considered.

5.2. Intrinsic Reaction Coordinate (IRC)

A molecular system can be defined with molecular coordinates $z_A$. The indices A represent the (possibly mass-weighted) $3N_{atom}$ Cartesian coordinates of the atomic position, but other coordinate systems are also possible.

The potential energy of the chemical system is given as the scalar function $E(\{z_A\})$. In practical applications, point-wise access to the potential energy surface is defined. For example, a black-box function, which is fed a particular set of molecular coordinates $\{z_A\}$ into and retrieve the value of E at that point.

Access to a similar black-box function (with similar cost) for the potential energy gradient $$g_A(\{z_A\}) \equiv \frac{dE}{dz_A'}\bigg|_{z_A'=z_A}$$

may also be given. Higher derivatives such as potential energy Hessians are also possible but are orders of magnitude more expensive than the energy and gradient functions above. Efficient global access to the functional details of the potential energy surface at all points in the molecular coordinate space is generally not available or knowable. Moreover, each computation of the energy or gradient takes a nonzero amount of computational effort.

However, a very serious problem arises when we try to reverse this differential form procedure and integrate the IRC from the reactant and/or product to search for the transition state. At a transition state there exists a single direction of negative curvature indicating the direction from the transition state to the reactant or product, however, at a reactant or product geometry, all directions away from the minimum have positive curvature and therefore it is unknown which direction (or combination of directions) leads to the transition state. The crux of the problem is that we have no intrinsic information regarding which "reactive mode" direction to start our path in. Even in two dimensions (referring back to the mountain analogy), our alpine hiker encounters similar difficulties—it is very difficult to walk directly from Telluride to Mountain Village while keeping the hike always directly uphill or downhill, as very small changes in the initial direction starting out from the town can cause very large divergences in the later and/or higher energy stages of the path. In higher dimensions, this problem is exponentially harder (i.e., more difficult and more computationally expensive). Many numerical methods such as the growing string method (GSM) attempt to explicitly integrate the differential form of the IRC and then subsequently correct the path for "diagonal" excursions encountered during the integration. These methods begin with only one of the reactant and/or product endpoints defined. However, calculating the transition state from defined reactants and products is more useful than having only one reactant and/or product endpoint and needing the transition state, when GSM-type methods are often subject to failure. Moreover, in practical deployment, the GSM-type methods remarkably often fail to converge robustly to a reasonable transition state and/or IRC path.

It is well known to those skilled in the art that GSM methods may fail to produce a topologically connected path in a substantial number of cases. In one instance of this case, the double-ended growing string search phase explores uphill in both directions from two minima and fails to find a connected path that physically connects the two minima. In another case, the single-ended growing string search phase explores uphill from one minimum and finds a very high lying transition state (or even a higher-order saddle point) that is not physically interesting for the problem at hand due to a lack of information about the physical nature of the second minimum. Finally, in either the double- or single-ended GSM methods, even if the search phase finds a topologically reasonable path, the subsequent numerical optimization of the details of this path are known to be often remarkably slow and/or commonly fail to numerically converge to a tight solution to the IRC.

Many other methods exist which attempt to treat the IRC path between two known reactant and product endpoints as a monolithic object. Most of these methods heuristically optimize some form of squared path-gradient-tangency condition, i.e., they are working with a boundary-value-lifted heuristic representation of the previous shooting form of the differential IRC form. Such methods include the highly popular nudged elastic band (NEB) heuristic. However, despite numerous heuristic adjustments, these methods remarkably often fail to converge robustly to a reasonable transition state and/or IRC path. Most of these failures can be traced to the fact that these heuristic path optimization methods do not have a proper objective function to optimize.

One aspect of our disclosure pertains to a dual-level path integral approach for the numerical optimization of the IRC action. A first polynomial spline in an auxiliary time coordinate t is used to describe the IRC path, $z_A(t; \{z^{*C}_A\})$, where $\{z^{*C}_A\}$ is a discrete set of unconstrained path control parameters that transform the problem from a variational calculus form to a variational continuous optimization problem amenable for efficient implementation on modern computers. However, in marked contrast to VRC, the position spline is not immediately used to resolve the full action path integral in a single step. Instead, the IRC action path integral is broken into two nested integrals, each separately involving a splined integrand, and they are resolved sequentially. Explicitly, the path position spline is used to resolve the first length path integral, $$l[t; z_A(t)] \equiv \int_0^t dt' \sqrt{\sum_A \left(\frac{dz_A}{dt'}\right)^2} \quad (1)$$

The total path length is $L \equiv l(t=1)$. The first path length integral above (equation 1) can be efficiently evaluated to arbitrary accuracy (e.g., to the machine precision) by modern numerical techniques (e.g., known numerical techniques), and has no dependency on potential energy surface considerations. Moreover, no new constraints are applied to the path control parameters. A substitution to change a variable in the single action integral from the unphysical variable t to the physical variable l can now be used, noting that, $$dl = dt \sqrt{\sum_A \left(\frac{dz_A}{dt}\right)^2} \quad (2)$$

This yields the second, nested action path integral (equation 3), $$a[l; z_A(l)] \equiv \int_0^l dl' \sqrt{\sum_B (g_B(z_B(l')))^2} \quad (3)$$

The total action is $A \equiv a(l=L)$. Therefore, much of the numerical effort of our dual-spline method is related to resolving the second form of the action integral with a reduced (e.g., minimal) number of potential energy evaluations.

One aspect of our disclosure pertains to a second polynomial spline, $g_A(l; \{g_A^S\})$, which is chosen to provide a model for the potential energy gradient at arbitrary displacements l along the path. The parameters $\{g_A^S\}$ are uniquely determined as those which cause the polynomial model of the gradient to coincide exactly with the true gradient $g_A(\{z_A\})$ at a set of path positions $\{z_A^S\}$ taken from an extrinsically fixed and regularly-spaced set of path length sampling points $\{l_S\}$. One preferential embodiment of the method uses Chebyshev-Gauss-Lobatto nodes for $\{l_S\}$, but many other choices are possible (e.g. Tanh-Sinh quadrature, Gauss-Legendre quadrature, or Clenshaw-Curtis quadrature). With the second gradient spline model $g_A(l)$ now wholly determined by the first position spline and the potential energy gradient samples, the second action integral may now be evaluated to arbitrary accuracy (e.g., to the machine precision) by modern numerical techniques (e.g., Gaussian quadrature). This numerical integration procedure makes no additional references to the potential energy surface other than those already performed at the sampling points, e.g., no adaptive multiresolution quadratures involving repeated queries to the potential energy surface are needed.

One aspect of our disclosure pertains to the fact that our total action path integral is fully differentiable with respect to the discrete set of unconstrained path control parameters $\{z^{*C}_A\}$ without any noise terms stemming from adaptive quadrature procedures involving repeated queries to the potential energy surface. A modern and exact Lagrangian approach for these analytic derivatives is capable of providing an efficient numerical implementation of the analytical derivative to arbitrary precision with a sampling cost at each sampling point of usually ~2-4× that of the corresponding gradient, which is vastly lower than a full Hessian. Overall, the cost of each action analytic derivative is roughly 2-4× the cost of each action evaluation and can be made to use only potential energy gradient evaluations.

One aspect of our disclosure pertains to the fact that our working parameter set in terms of the control points $\{z^{*C}_A\}$ are wholly unconstrained.

One aspect of our disclosure is that the aggregation components of a differentiable, unconstrained, and faithful IRC objective function immediately render the method amenable to practical numerical optimization via standard gradient-based unconstrained continuous optimization recipes such as quasi-Newton methods. In some embodiments, L-BFGS (limited-memory Broyden-Fletcher-Goldfarb-Shanno algorithm) can be used to optimize IRC paths. In some embodiments, the numerical optimization technique is a quasi-Newton method.

In some embodiments, only discrete sampling of well-behaved quantities that are easy to model with low-order polynomials such as the position and gradient components is performed. Integrals over ill-behaved quantities such as the speed or action integrands (e.g., ill-behaved due to the strongly non-polynomial behavior of the square root) may be evaluated to arbitrary position after sampling of the underlying well-behaved quantities is performed.

One aspect of our disclosure is that a far smaller number of control points than sampling points can be used to parametrize a representative approximate IRC, avoiding, e.g., the drastic rise in number of parameters that occurs when using NEB with large numbers of beads. For example, in some embodiments, it is possible to use as few as one interior control point with as many sampling points as you like to get a good rough description of the path.

While the above written description enables one of ordinary skill to make and use this method, those of ordinary skill will recognize that variations of the various embodiments are possible. The application should therefore not be limited by the particular description above.

5.3. Enumerated Embodiments

Embodiment 1. A dual-level nested path integral method to numerically optimize an approximation to the intrinsic reaction coordinate $z^*_A(l)$ for a chemical reaction for a system with continuous molecular coordinates $z_A$ starting from an independently defined potential energy surface function $E(\{z_A\})$ and an extrinsically defined pair of reactant and product molecular coordinates $z_A^R$ and $z_A^P$ on this potential energy surface, the method comprising:

a. defining a fictitious "time" coordinate t to define progress along the intrinsic reaction coordinate, with t=0 corresponding to the reactant and t=1 corresponding to the product, such that the intrinsic reaction coordinate is continuously defined for $t \in [0, 1]$;

b. defining an $N_{control}$-order polynomial spline $z_A(t) \equiv P_{N_{control}}(t; \{z^{*C}_A\})$ parametrized in the variable $t \in [0, 1]$ for each molecular coordinate A and constrained such that the endpoints correspond to the reactant, $z_A(t=0) \equiv z_A^R$, and product, $z_A(t=1) \equiv z_A^P$; there are many equivalent ways to parametrize such a spline, but one particularly convenient way is to define a set of $N_{control+1}$ "control points" $\{z^{*C}_A\}$ that the spline is defined to interpolate at a fixed set of collocation times $\{t_C\}$ including $t_{C=0} \equiv 0$ and $t_{C=N_{control}} \equiv 0$. The endpoint constraint can be achieved by constraining $z^{*C=0}_A \equiv z_A^R$ and $z^{*C=N_{control}}_A \equiv z_A^P$. There now exist an infinite number of possible splines, $z_A(t)$ parametrized in the discrete set of unconstrained continuous coordinates of the interior control points $\{z^{*C}_A, C \in \{1, \ldots, N_{control-1}\}\}$. This first spline is defined as the intrinsic reaction coordinate position spline;

c. computing the first length path integral, $$l(t) \equiv \int_0^t dt' \sqrt{\sum_A \left(\frac{dz_A(t')}{dt'}\right)^2},$$

to arbitrary precision for the given intrinsic reaction coordinate path;

d. computing the total length $L \equiv l(t=1)$ for the given intrinsic reaction coordinate path;

e. defining a set of $N_{sample+1}$ fixed relative length points $\{u_S \in [0, 1]\}$; this set is fixed for all path integral candidates as a set of desired unitless collocation points, e.g., the set of uniformly spaced points or the Chebyshev-Gauss-Lobatto points;

f. defining a set of $N_{sample+1}$ path-length-specific length points $\{l_S \equiv Lu_S \in [0, L]\}$;

g. defining the set of $N_{sample+1}$ path-metric-specific time points $\{t_S : l(t_S) = l_S\}$;

h. defining the set of $N_{sample+1}$ path-specific sampling positions $\{z_A^S \equiv z_A(t_s)\}$;

i. computing the gradient of the potential energy surface at the sampling positions $$\left\{ g_A^S \equiv \left. \frac{dE}{dz_A} \right|_{z_A = z_A^S} \right\};$$

j. defining an $N_{sample}$-order polynomial spline, $g_A(l) \equiv P_{N_{sample}}(l; \{z^{*S}_A\})$, parametrized in the variable $l \in [0, L]$ for each molecular coordinate. The parameters $\{z^{*S}_A\}$ or equivalent are constrained so that the spline collocates the gradient, i.e., $g_A(l_S) = g_A^S \forall A, S$. This spline represents a polynomial model of the gradient that collocates the true gradient of the potential energy surface at sample points $z_A^S$. There are no free degrees of freedom in this spline—all spline parameters are fully constrained and defined by the underlying position spline, the choice of relative length sampling lengths, and the characteristics of the potential energy surface. This second spline is defined as the intrinsic reaction coordinate gradient spline;

k. computing the second action path integral, $$a(l) \equiv \int_0^l dl' \sqrt{\sum_A (g_A(l'))^2},$$

to arbitrary precision for the given intrinsic reaction coordinate path;

l. computing the total action, $A \equiv a(l=L)$, for the given intrinsic reaction coordinate path;

m. computing the analytic gradient of the total action with respect to the unconstrained control parameters of the intrinsic reaction coordinate position spline, $$G_A^C \equiv \frac{dA}{dz^{*C}_A};$$

n. using the proceeding steps to construct black-box functions for the computation of the action $A(\{z^{*C}_A\})$ and its gradient $G_A^C(\{z^{*C}_A\})$ in terms of the unconstrained path control parameters $\{z^{*C}_A\}$;

o. using continuous gradient-based optimization methods to reduce (e.g., minimize) the action A with respect to the unconstrained path control parameters $\{z^{*C}_A\}$;

p. evaluating any desired properties, such as the guess for the transition state coordinates, from the continuous definition of the optimized intrinsic reaction coordinate path $z_A(t)$.

Embodiment 2. The method according to any one of the preceding embodiments, wherein additional quantities beyond the total action are added to the optimization objective function, e.g., total path length penalties, integral path curvature penalties.

Embodiment 3. The method according to any one of the preceding embodiments, wherein an alternative but equivalent parametrization of the intrinsic reaction coordinate position spline is utilized, e.g., parametrization in monomial, Lagrange, or Chebyshev spectral coefficients of the polynomial spline instead of the interior control points $\{z^{*C}_A, C \in \{1, \ldots, N_{sample-1}\}\}$.

Embodiment 4. The method according to any one of the preceding embodiments, wherein the intrinsic reaction coordinate position and/or gradient spline is cubic splines, trigonometric functions, or wavelets.

Embodiment 5. The method according to any one of the preceding embodiments, wherein full potential energy surface Hessian or potential energy surface tomography information is used to accelerate the numerical convergence of the intrinsic reaction coordinate procedure.

Embodiment 6. The method according to any one of the preceding embodiments, wherein non-Cartesian coordinates are used for the molecular coordinates, e.g., redundant internal coordinates.

Embodiment 7. The method according to any one of the preceding embodiments, wherein non-Euclidean metrics are used in the length or action path integrals, e.g., the Riemannian metrics of redundant internal coordinates.

Embodiment 8. The method according to any one of the preceding embodiments, wherein the coordinates represent spacetime coordinates of a relativistic celestial system.

Embodiment 9. The method according to any one of the preceding embodiments, wherein the path integrals over metrics represent the action of a trajectory of a relativistic celestial system.

Embodiment 11. The method according to any one of the preceding embodiments, wherein the coordinates represent subatomic spatiotemporal coordinates of a subatomic particle reaction or collision system.

Embodiment 12. The method according to any one of the preceding embodiments, wherein the path integrals over metrics represent the action of a subatomic particle reaction or collision system.

Embodiment 13. The method according to any one of the preceding embodiments, wherein the path integrals over metrics represent the action of a radioactive nucleus.

Embodiment 14. The method according to any one of the preceding embodiments, wherein the path integrals over metrics represent the action of a virtual particle reaction system.

5.4. Example Graphical Representation of the Method

Figure 1A:
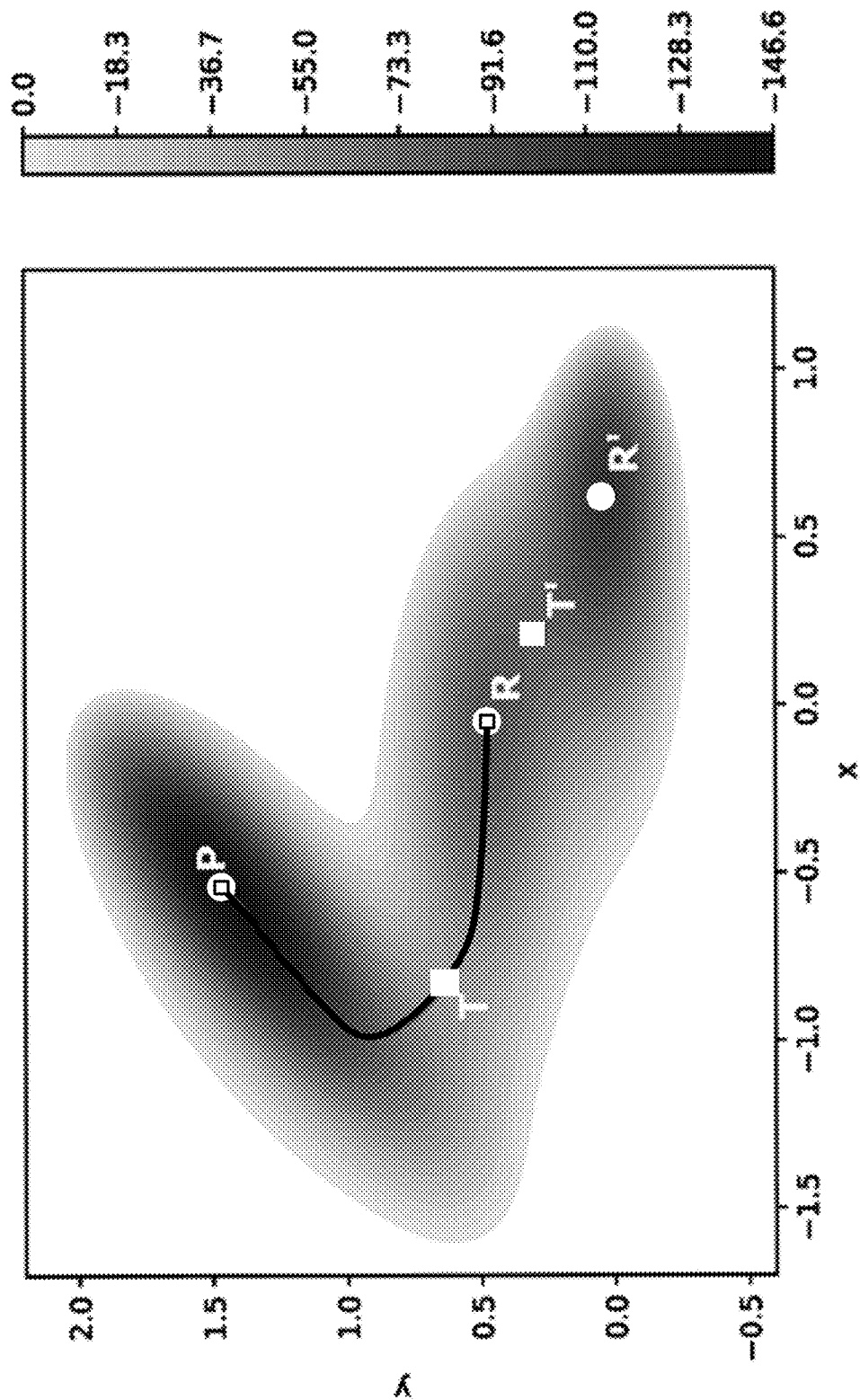
FIG. 1A illustrates a schematic representation of a representative potential energy surface with associated chemical reactant/product/transition state configurations and associated intrinsic reaction coordinate.

FIG. 1A illustrates a schematic representation of the potential energy surface in two coordinates "x" and "y" which are emblematic of the continuous atomic coordinates of the chemical system. In most polyatomic chemical systems, this potential energy surface is a hyperspace in 3N atom coordinates, and a figure such as the present one would represent a projection of the involved quantities form this hyperspace onto a subspace of only two coordinates. The potential energy surface is depicted as a contour map of energy levels. The reactant is a configuration of the chemical system which is at a simple local minimum of the potential energy surface at the atomic coordinates denoted by (R). The product is a configuration of the chemical system which is at a simple local minimum of the potential energy surface at the atomic coordinates denoted by (P).

The transition state is a configuration of the chemical system which is at a first-order saddle point of the potential energy surface at the atomic coordinates denoted by (T). The intrinsic reaction coordinate (IRC) is the unique continuous one-dimensional path (e.g., there may be many paths but only one of them (the unique one) goes from R to P through T in such a way that the gradient is tangent to the path) connecting reactants and products through the transition state in such a way that the gradient of the potential energy is tangent to the path at every point (visually indicated by the path always crossing contour lines at right angles). Other reactants/products (R') and transition states (T') often exist on a potential energy surface, and other intrinsic reactions (not shown) exist for these other chemical reactions, see FIGS. 1A and 1B.

Figure 1B:
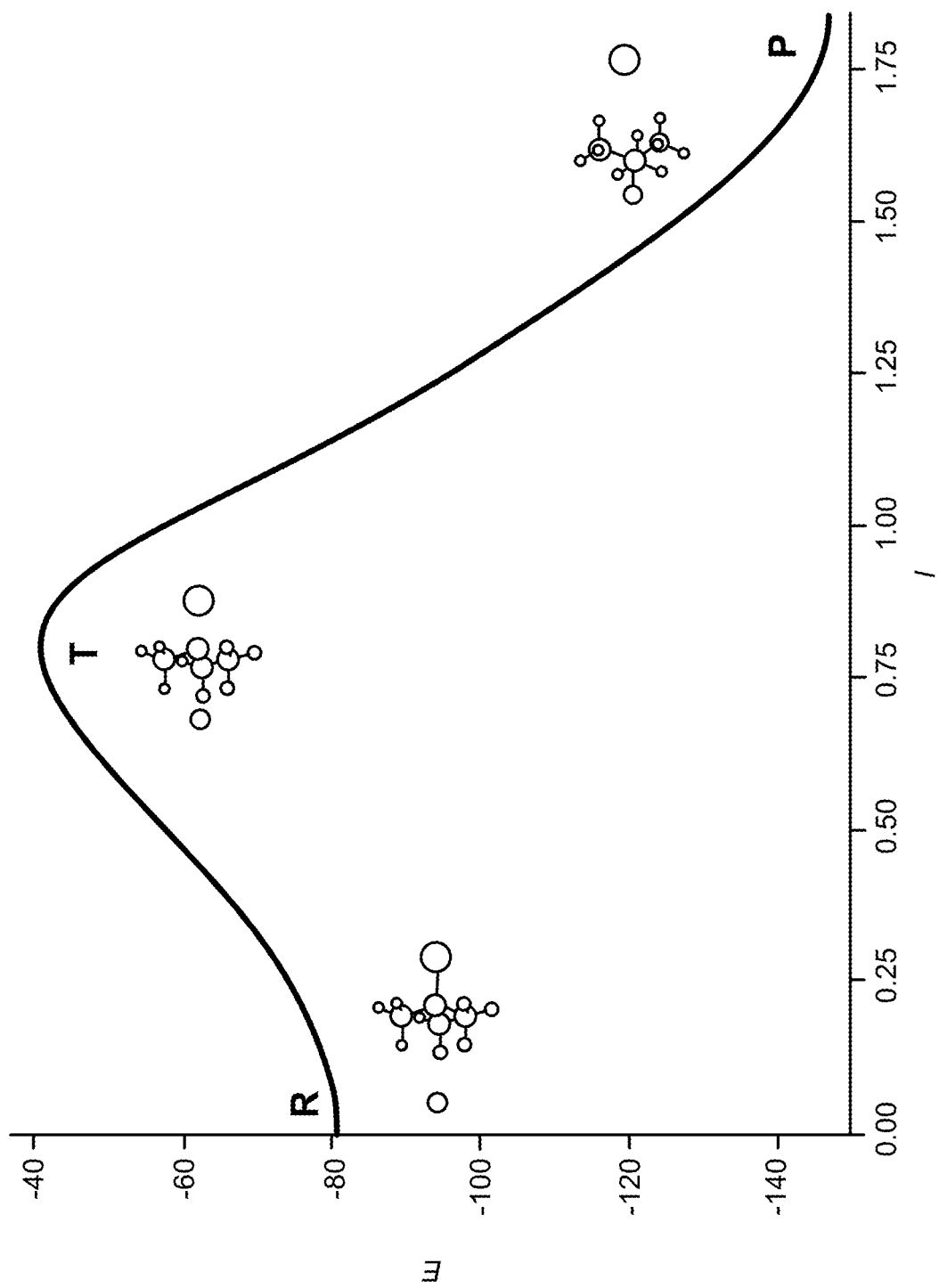
FIG. 1B illustrates a schematic representation of the potential energy along the intrinsic reaction coordinate, with the length along the intrinsic reaction coordinate path used as the metric for the plot x coordinate.

FIG. 1B illustrates an example schematic representation of the potential energy along the intrinsic reaction coordinate, with the length along the intrinsic reaction coordinate path used as the metric for the plot x coordinate.

FIGS. 2A-2I and their below descriptions below provide detailed steps of an example dual-level nested path integral method for intrinsic reaction coordinate optimization. The steps are shown for a schematic example in two dimensions, but the example method is applicable without modification in an arbitrary number of dimensions. The steps are shown for a particular preferred embodiment of the method, though many variations are possible.

In FIG. 2A, the potential energy surface, $E(\{z_A\})$, with starting reactant (R), $z_A(t=0) \equiv z_A^R$, and ending product (P), $z_A(t=1) \equiv z_A^P$, points highlighted. An approximation to the intermediate transition state (T) point will be determined as an aside of the intrinsic reaction coordinate optimization method.

In FIG. 2B, the intrinsic reaction coordinate control points $\{z^*_A{}^C\}$ are placed on the potential energy surface (e.g., arbitrarily by the user as a set of input values). This case uses an intrinsic reaction coordinate position spline of order $N_{control}=4$, yielding $N_{control}+1=5$ control points. Of these, 2 control points are fixed at the endpoints, leaving 3 interior control points open as the unrestricted parameters of the position spline.

In FIG. 2C, the spline, $z_A(t) \equiv P_{N_{control}}(t; \{z^*_A{}^C\})$, $t \in [0, 1]$, fully defines the continuous intrinsic reaction coordinate path. It is visually apparent that varying the interior control point parameters $\{z^*_A{}^C\}$ will change the definition of the path.

In FIG. 2D, the first length path integral, $$l(t) \equiv \int_0^t dt' \sqrt{\sum_A \left(\frac{dz_A(t')}{dt'}\right)^2},$$

is determined to arbitrary precision from the characteristics of the position spline. It is apparent that time t and length l are bijective quantities, but are not linearly correlated, e.g., uniform sampling in t will not yield uniform sampling in l. Because t and l are bijective quantities, any path-dependent quantity can be parameterized in terms of either t or l. Moreover, inverse maps exist to change between these variables. The total length L is found as $L \equiv l(t=1)$.

In FIG. 2E, sampling the Chebyshev-spaced length coordinates $l_S = L u_S$ in l includes inverting the length path integral to determine the corresponding time coordinate $t_S$. For this example, $N_{sample}=16$, yielding $N_{sample}+1=17$ sample points. The integral inversion is the mathematical means to switch between time and length parameterizations. $l_S$ is the set of Chebyshev-spaced length coordinates. The subscript s indexes the sampling points. These are defined from the set of $u_S$ and the total path length. The number of control points does not have any bearing on the number of sample points.

In FIG. 2F, the intrinsic reaction coordinate position spline can now be evaluated at the sampling times to obtain the sampling positions $z_A^S \equiv z_A(t_S)$. The distance along the path between these sampling positions is determined by the metric in l, e.g., Chebyshev-spaced $\{l_S\}$ will yield Chebyshev-spaced path length distances between sampling positions $\{z_A^S\}$. The gradient of the potential energy, $$g_A^S \equiv \left.\frac{dE}{dz_A}\right|_{z_A = z_A^S}$$

can now be evaluated at each sampling point $z_A^S$.

In FIG. 2F, the gradient samples now completely determine a second polynomial spline model of the gradient in the metric l, (i.e., $g_A(l) \equiv P_{Nsample}(l; \{g_A^S\})$) such that the gradient spline collocates the gradient samples at the sampling points. There are two considerations here, each leading to the increased numerical stability over other approaches. Chebyshev-spacing minimizes oscillations near the boundaries (known as Runge's phenomenon) by tending to place points more densely near the boundaries. Further, using this spacing in the length coordinate avoids numerical instabilities (known as kinking in the NEB methods). The characteristics of this second gradient polynomial spline are completely determined by the characteristics of the first position polynomial spline, the fixed family of relative sampling lengths, and the characteristics of the potential energy surface at the sampling points.

In FIG. 2G, the second, nested, action path integral $$a(t) \equiv \int_0^t dt' \sqrt{\sum_A (g_A(l'))^2}$$

is determined to arbitrary precision from the characteristics of the gradient spline. The total action A is found as $A \equiv a(l=L)$.

In FIG. 2H, the analytical gradient of the total action with respect to the interior control points of the intrinsic reaction coordinate position spline can now be determined, as indicated on the schematic by small arrows. Standard continuous optimization techniques can now be used together with the black box functions developed to this point for total action and total action gradient to optimize the candidate intrinsic reaction coordinate by varying the interior control points $\{z^*_A{}^C\}$. The optimization is depicted as the sequence of paths which vary from the right side of the graph at the starting intrinsic reaction coordinate path guess to the solid black line intersecting (T) (a white square) at the optimized intrinsic reaction coordinate.

The optimized dual-level path integral position spline is illustrated in 2I. Note that the stationary intrinsic reaction coordinate path spline may not exactly correspond to the true intrinsic reaction coordinate due to incompleteness in the set of allowed paths under the finite size of $N_{control}$. Estimates for the transition state coordinates (black square over white square), transition state imaginary mode (white tangent under black square), reactive modes (2× white tangents under white circles), and any other desired properties can now be extracted from the continuous representation of the optimized intrinsic reaction coordinate, see FIG. 2I.

5.5. Example Methods

FIG. 3 is a flowchart of an example method 300 for determining an intrinsic reaction coordinate (IRC) path from a reactant molecular geometry to a product molecular geometry of a chemical transformation on a potential energy surface, according to one or more embodiments. In the example of FIG. 3, the method 300 is performed by a computing system (e.g., computer system 1000). Instructions for the method 300 may be stored as program code that is executable by the computing system. The steps may be performed in different orders, and the method 300 can include greater or fewer steps than described herein.

At step 310, the computing system performs a dual nested integration of two polynomial splines. Performing the dual nested integration of two polynomial splines includes steps 315-335.

At step 315, the computing system parameterizes a first polynomial spline according to a set of control points. The first polynomial spline describes molecular coordinates as a function of a parameter coordinate describing progress along a candidate IRC path. The control points may be uniformly spaced along the first polynomial spline. The parameter may be an arbitrary time coordinate, t (also referred to as a fictitious time coordinate), where the first polynomial spline is constrained at t=0 and t=1 (e.g., where t=0 represents the start of the chemical transformation and t=1 represents the end of the chemical transformation). In some embodiments, a chemical transformation includes a chemical reaction (e.g., breaking or forming covalent or ionic bonds).

In some embodiments, two interior control points are used. In some embodiments, three interior control points are used. In some embodiments, four interior control points are used. In some embodiments, five interior control points are used. In some embodiments, six interior control points are used. In some embodiments, seven control points are used. In some embodiments, eight interior control points are used. In some embodiments, nine interior control points are used. In some embodiments, ten interior control points are used. In some embodiments, one to ten interior control points are used. In some embodiments, 11 to 20 interior control points are used. In some embodiments, 21 to 50 interior control points are used. In some embodiments, 1 to 20 interior control points are used. In some embodiments, 1 to 50 interior control points are used. In some embodiments, 1 to 100 interior control points are used. In some embodiments, 1 to 500 interior control points are used. In some embodiments, the number of interior control points used is arbitrarily large (e.g., 100 or more).

At step 320, the computing system computes the integral of the first polynomial spline. The integrated first polynomial spline describes length along the candidate IRC path as a function of the parameter coordinate. In some embodiments, the integral of the first polynomial spline is $$\int_0^t dt' \sqrt{\sum_A \left(\frac{dz_A}{dt'}\right)^2},$$

where $z_A$ represents continuous molecular coordinates. For example, see Eqn. 3 and its description.

At step 325, the computing system generates a second polynomial spline by inverting the length and parameter coordinates of the integrated first polynomial spline. Thus, the second polynomial spine may be parametrized by the length coordinate along the candidate IRC path.

At step 330, the computing system parameterizes the second polynomial spline according to interpolated sampling points along the integral of the first polynomial spline. The second polynomial spline describes the gradient of the potential energy surface along the candidate IRC path.

In some embodiments, two sampling points are used. In some embodiments, three sampling points are used. In some embodiments, four sampling points are used. In some embodiments, five sampling points are used. In some embodiments, six sampling points are used. In some embodiments, seven sampling points are used. In some embodiments, eight sampling points are used. In some embodiments, nine sampling points are used. In some embodiments, ten sampling points are used. In some embodiments, one to ten sampling points are used. In some embodiments, 11 to 20 sampling points are used. In some embodiments, 21 to 50 sampling points are used. In some embodiments, 1 to 20 sampling points are used. In some embodiments, 1 to 50 sampling points are used.

At step 335, the computing system computes an action integral, which is the integral of the second polynomial spline. The integral of the first polynomial spline is the integrand of the second polynomial spline integral.

In some embodiments, the integral of the second polynomial spline is $$\int_0^l dl' \sqrt{\sum_A (g_A(l'))^2},$$

where $g_A$ is the second polynomial spline approximating the gradient of the potential energy surface with respect to the molecular coordinates as a function of the length coordinate l'. For example, see step k of Section 5.3: Enumerated Embodiments. In other embodiments, the integral of the second polynomial spline is $$\int_0^l dl' \sqrt{\sum_B (g_B(z_B(l')))^2},$$

wherein l' is the length coordinate, $z_B$ represents continuous molecular coordinates, and $g_B$ is the gradient of the potential energy surface. For example, see Eqn. 5 and its description.

At step 340, the computing system determines the IRC path based on the action integral. For example, the gradient of the action integral along the IRC path is determined. Determining the IRC path may further include reducing (e.g., minimizing) the value of the action integral, for example using a gradient-based optimization method. In some embodiments, the optimization method applied to the action integral is a continuous optimization method (e.g., linear or nonlinear programming). In some embodiments, the optimization method applied to the action integral is a discrete optimization method.

In some embodiments, estimating the intrinsic reaction coordinate (IRC) path from a reactant molecular geometry to a product molecular geometry of a chemical transformation on a potential energy surface does not include determining the Hessian of an objective function at or between any control point or sampling point, wherein the objective function is the action integral.

In some embodiments, the method 300 is applied iteratively to (e.g., different) candidate IRCs defined by one transition state to determine the IRC path. For example, step 310 (including steps 315-335) is repeated for different candidate IRC paths.

In some embodiments, the method 300 is applied iteratively to (e.g., different) candidate IRCs defined by one or more transition states to determine the IRC path. For example, step 310 (including steps 315-335) is repeated for different candidate IRC paths.

In some embodiments, the method 300 is applied iteratively to (e.g., different) candidate IRCs defined by more than one transition state to determine the IRC path. For example, step 310 (including steps 315-335) is repeated for different candidate IRC paths.

Other aspects include components, devices, systems, improvements, methods, processes, applications, computer readable mediums, and other technologies related to any of the above.

5.6. Computing System Architecture

FIG. 4 is a block diagram illustrating an embodiment of components of an example machine able to read instructions from a machine-readable medium and execute them in a set of one or more processors (or controller). Specifically, FIG. 4 shows a diagrammatic representation of a machine in the example form of a computer system 1000 (also "computing system 1000") within which program code (e.g., software) for causing the machine to perform any one or more of the methodologies discussed herein may be executed. The computer system 1000 may be used for one or more components described herein, such as the server 411, the shared display 403, and the HMDs 407. The program code may be comprised of instructions 1024 executable by a set of one or more processors 1002 (if there are multiple processors, they may execute the instructions individually or collectively) of the computer system 1000. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1024 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1000 includes a set of one or more processors 1002 (e.g., including one or more central processing units (CPUs), one or more graphics processing units (GPUs), one or more digital signal processors (DSPs), one or more application specific integrated circuits (ASICs), one or more radio-frequency integrated circuits (RFICs), one or more field programmable gate arrays (FPGAs), or some combination thereof), a main memory 1004, and a static memory 1006, which are configured to communicate with each other via a bus 1008. The computer system 1000 may further include visual display interface 1010. The visual interface may include a software driver that enables (or provide) user interfaces to render on a screen either directly or indirectly. The visual interface 1010 may interface with a touch enabled screen. The computer system 1000 may also include input devices 1012 (e.g., a keyboard a mouse), a storage unit 1016, a signal generation device 1018 (e.g., a microphone and/or speaker), and a network interface device 1020, which also are configured to communicate via the bus 1008.

The storage unit 1016 includes a machine-readable medium 1022 (e.g., magnetic disk or solid-state memory) on which is stored instructions 1024 (e.g., software) embodying any one or more of the methodologies or functions described herein. The instructions 1024 (e.g., software) may also reside, completely or at least partially, within the main memory 1004 or within the set of one or more processors 1002 (e.g., within a set's cache memory) during execution.

5.7. Additional Considerations

The disclosure herein describes example embodiments for purposes of illustration only. Any features that are described as essential, important, or otherwise implied to be required should be interpreted as only being required for that embodiment and are not necessarily included in other embodiments.

Some portions of the above disclosure describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the disclosure but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the disclosure.

What is claimed is:

1. A method of determining an intrinsic reaction coordinate (IRC) path from a reactant molecular geometry to a product molecular geometry of a chemical reaction on a potential energy surface, the method comprising:

accessing, by a computer system, data indicating a potential energy surface function and molecular coordinates;

performing, by the computer system, a dual nested integration of two polynomial splines, wherein performing the dual nested integration comprises:

parameterizing a first polynomial spline according to a set of control points corresponding to locations on the potential energy surface of the chemical reaction, the first polynomial spline describing molecular coordinates as a function of a parameter coordinate describing progress along a candidate IRC path from the reactant molecular geometry to the product molecular geometry;

computing the integral of the first polynomial spline, the integrated first polynomial spline describing length along the candidate IRC path as a function of the parameter coordinate;

generating a second polynomial spline by inverting the length and parameter coordinates of the integrated first polynomial spline;

parameterizing the second polynomial spline according to interpolated sampling points along the integral of the first polynomial spline, the second polynomial spline describing the gradient of the potential energy surface of the chemical reaction along the candidate IRC path from the reactant molecular geometry to the product molecular geometry; and computing an action integral, the action integral being the integral of the second polynomial spline, wherein the integral of the first polynomial spline is the integrand of the second polynomial spline integral;

determining, by the computer system, the IRC path from the reactant molecular geometry to the product molecular geometry based on the action integral, the IRC path indicating a feasibility of the chemical reaction; and based on the IRC path indicating the chemical reaction is feasible, selecting to perform the chemical reaction to generate the product molecular geometry from the reactant molecular geometry.

2. The method of claim 1, wherein determining the IRC path from the reactant molecular geometry to the product molecular geometry of a chemical reaction on a potential energy surface does not include determining the Hessian of an objective function at or between any control point or sampling point, wherein the objective function is the action integral.

3. The method of claim 1, wherein the parameter coordinate describing progress along the candidate IRC path is an arbitrary time coordinate t, wherein the first polynomial spline is constrained at t=0 and t=1.

4. The method of claim 1, wherein the integral of the first polynomial spline is:

$$\int_0^t dt' \sqrt{\sum_A \left(\frac{dz_A}{dt'}\right)^2},$$

wherein $z_A$ represents continuous molecular coordinates.

5. The method of claim 1, wherein the integral of the second polynomial spline is:

$$\int_0^l dl' \sqrt{\sum_A (g_A(l'))^2},$$

wherein $g_A$ is the second polynomial spline approximating the gradient of the potential energy surface with respect to the molecular coordinates as a function of the length coordinate l'.

6. The method of claim 1, wherein the integral of the second polynomial spline is:

$$\int_0^l dl' \sqrt{\sum_B (g_B(z_B(l')))^2},$$

wherein l' is the length coordinate, $z_B$ represents continuous molecular coordinates, and $g_B$ is the gradient of the potential energy surface.

7. The method of claim 1, wherein the method is applied iteratively to candidate IRCs defined by more than one transition state.

8. The method of claim 1, wherein the set of control points are uniformly spaced along the first polynomial spline.

9. The method of claim 1, wherein determining the IRC path based on the action integral comprises determining the gradient of the action integral along the IRC path.

10. The method of claim 9, wherein determining the IRC path based on the action integral further comprises determining the IRC path by reducing the value of the action integral.

11. The method of claim 10, wherein the value of the action integral is reduced using gradient-based optimization.

12. A non-transitory computer-readable storage medium storing instructions for determining an intrinsic reaction coordinate (IRC) path from a reactant molecular geometry to a product molecular geometry of a chemical reaction on a potential energy surface, wherein the instructions, when executed by a computer, cause the computer to perform operations comprising:

accessing, by the computer, data indicating a potential energy surface function and molecular coordinates;

performing, by the computer, a dual nested integration of two polynomial splines, wherein performing the dual nested integration comprises:

parameterizing a first polynomial spline according to a set of control points corresponding to locations on the potential energy surface of the chemical reaction, the first polynomial spline describing molecular coordinates as a function of a parameter coordinate describing progress along a candidate IRC path from the reactant molecular geometry to the product molecular geometry;

computing the integral of the first polynomial spline, the integrated first polynomial spline describing length along the candidate IRC path as a function of the parameter coordinate;

generating a second polynomial spline by inverting the length and parameter coordinates of the integrated first polynomial spline;

parameterizing the second polynomial spline according to interpolated sampling points along the integral of the first polynomial spline, the second polynomial spline describing the gradient of the potential energy surface of the chemical reaction along the candidate IRC path from the reactant molecular geometry to the product molecular geometry; and computing an action integral, the action integral being the integral of the second polynomial spline, wherein the integral of the first polynomial spline is the integrand of the second polynomial spline integral;

determining, by the computer, the IRC path from the reactant molecular geometry to the product molecular geometry based on the action integral, the IRC path indicating a feasibility of the chemical reaction; and based on the IRC path indicating the chemical reaction is feasible, selecting to perform the chemical reaction to generate the product molecular geometry from the reactant molecular geometry.

13. The computer-readable storage medium of claim 12, wherein determining the IRC path from the reactant molecular geometry to the product molecular geometry of a chemical reaction on a potential energy surface does not include determining the Hessian of an objective function at or between any control point or sampling point, wherein the objective function is the action integral.

14. The computer-readable storage medium of claim 12, wherein the parameter coordinate describing progress along the candidate IRC path is an arbitrary time coordinate t, wherein the first polynomial spline is constrained at t=0 and t=1.

15. The computer-readable storage medium of claim 12, wherein the integral of the first polynomial spline is:

$$\int_0^t dt' \sqrt{\sum_A \left(\frac{dz_A}{dt'}\right)^2},$$

wherein $z_A$ represents continuous molecular coordinates.

16. The computer-readable storage medium of claim 12, wherein the integral of the second polynomial spline is:

$$\int_0^l dl' \sqrt{\sum_A (g_A(l'))^2},$$

wherein $g_A$ is the second polynomial spline approximating the gradient of the potential energy surface with respect to the molecular coordinates as a function of the length coordinate l'.

17. The computer-readable storage medium of claim 12, wherein the integral of the second polynomial spline is:

$$\int_0^l dl' \sqrt{\sum_B (g_B(z_B(l')))^2},$$

wherein l is the length coordinate, $z_B$ represents continuous molecular coordinates, and $g_B$ is the gradient of the potential energy surface.

18. The computer-readable storage medium of claim 12, wherein the operations are applied iteratively to candidate IRCs defined by more than one transition state.

19. The computer-readable storage medium of claim 12, wherein the set of control points are uniformly spaced along the first polynomial spline.

20. The computer-readable storage medium of claim 19, wherein determining the IRC path based on the action integral comprises determining the gradient of the action integral along the IRC path.

\* \* \* \* \*